March 15, 1955   W. L. WHITSON ET AL   2,704,326
ELECTRICAL INTEGRATOR
Filed March 17, 1945

INVENTORS
WILLIAM L. WHITSON
JACOB RABINOW
WILLIAM B. McLEAN
BY Ralph L Chappell
ATTORNEY

United States Patent Office 2,704,326
Patented Mar. 15, 1955

2,704,326

ELECTRICAL INTEGRATOR

William L. Whitson, Takoma Park, Md., and Jacob Rabinow and William B. McLean, Washington, D. C., assignors to the United States of America as represented by the Secretary of the Navy Application March 17, 1945, Serial No. 583,284

2 Claims. (Cl. 250—27)

(Granted under Title 35, U. S. Code (1952), sec. 266)

This invention relates to acceleration integrators and particularly to integrators of the type employed in velocity-operated electronic relays.

It is a primary object of the present invention to provide a new and improved means for actuating an electronic relay when the velocity vector of a body carrying the relay turns through a predetermined angle. Specifically, the principal objective of the invention is to provide a new, improved, simple and effective means for tripping such a relay when the vertical component of velocity of an ascending aircraft reaches a predetermined value.

This and other objects of the invention are attained in accordance therewith by providing a velocity-operated relay comprising energy-storage means, a mass, elastic means for supporting said mass with respect to the body of which the velocity is to be determined, whereby said mass is instantaneously displaced by an amount determined by the acceleration of said body, and means governed by the movements of the mass for applying energy to the energy-storage means at rates determined by the instantaneous displacements of the mass, whereby the total energy accumulated by the storage means during a given period is proportional to the increase in velocity of the body during that period. The relay also comprises means responsive to a predetermined value of energy potential for performing work when the velocity of the body attains a predetermined value.

For a better understanding of the present invention, together with other and further objects thereof, reference is had to the following description taken in connection with the accompanying drawings and its scope will be pointed out in the appended claims.

Figure 1:
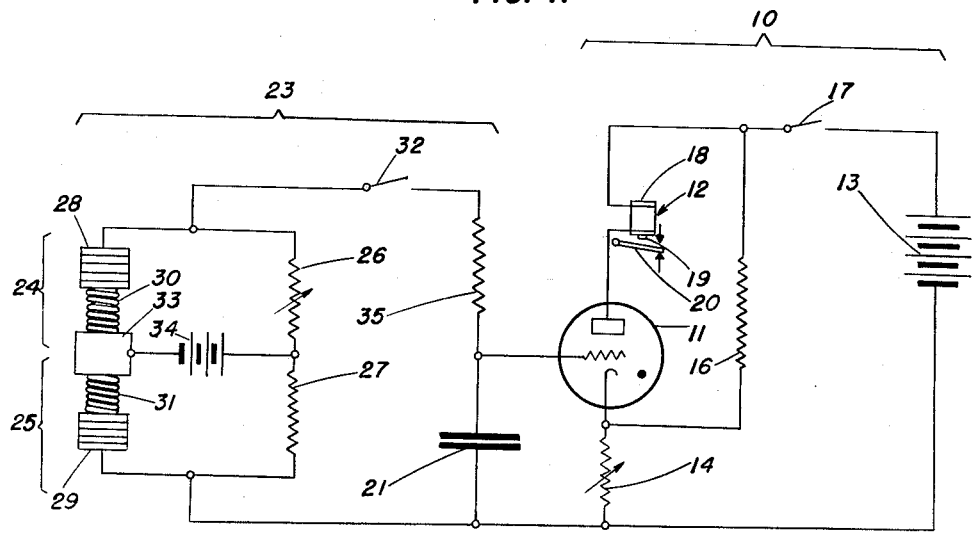
Figure 2:
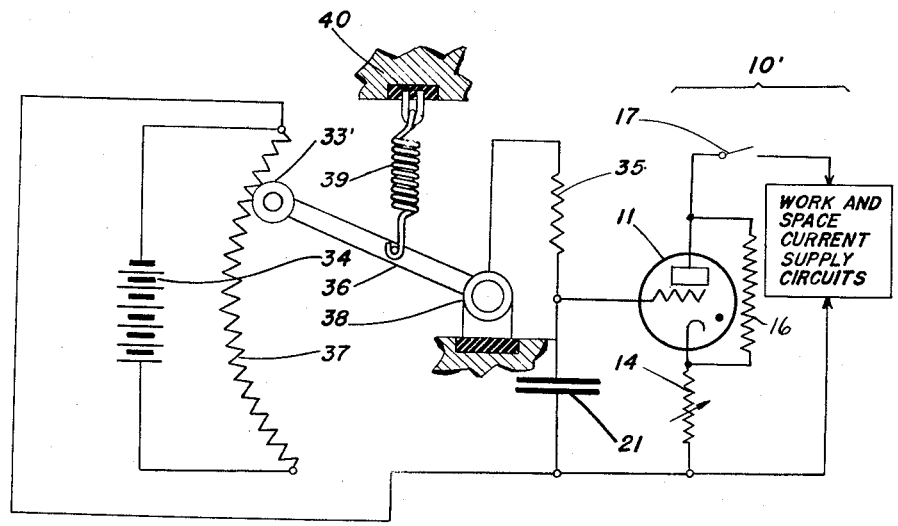

Referring to the drawings, Fig. 1 is a schematic diagram of a complete acceleration-operated electronic relay including an acceleration integrator in accordance with the invention, and Fig. 2 is a schematic diagram of a similar relay including a modified form of acceleration integrator arrangement in accordance with the invention.

Referring now more particularly to Fig. 1 of the drawings, the electronic velocity-operated relay there illustrated comprises a work circuit generally indicated at 10. The work circuit is coupled to the anode-cathode or output electrodes of a gas-filled grid-controlled electronic tube 11 of the "Thyratron" type. Also serially included in the work circuit are a solenoid 18 of an electromagnetic relay indicated generally at 12, a source of anode potential and space current 13, a variable cathode resistor 14 and a switch 17. A voltage-divider network consisting of serially related resistors 16 and 14 is shunted across the battery in order to bias the tube to a normal nonconductive state. Electromagnetic relay 12 consists of the solenoid 18, a core of magnetic material 19 and an armature 20 adapted to be attracted to the core when the current through the work circuit reaches a predetermined value.

The Fig. 1 embodiment also includes energy-storage means. This means comprises a capacitor 21 coupled to the input or control grid-cathode electrodes of tube 18 in such manner that the potential or voltage on the capacitor, upon attaining a predetermined value, overcomes the bias impressed on the tube by the voltage drop in cathode resistor 14, causing ionization of the tube gases, loss of control by the grid and a substantial flow of current in the work circuit.

The acceleration integrator included in the electronic relay illustrated in Fig. 1 also comprises means for applying energy to the condenser at a rate more fully to be discussed hereinafter. This means includes a supply circuit indicated generally at 23. The supply circuit comprises a Wheatstone bridge arrangement made up of ratio arms 24, 25, variable resistor 26 and a fixed resistor 27. Ratio arms 24, 25 comprise carbon pile resistors 28, 29, electrically and mechanically connected by metallic springs 30, 31 which individually bear on the carbon pile resistors at one end thereof and which are secured to a metallic weight 33 suspended between the springs. Connected in the circuit between the junction of resistors 26, 27 and the weight is a battery 34. The output circuit of the bridge is coupled through a switch 32 to an electrical integrating network comprising a resistor 35 and capacitor 21.

The modified embodiment of the invention illustrated in Fig. 2 is generally similar to that shown in Fig. 1. Like circuit elements have the same reference numerals and analogous circuit elements have the same reference numerals primed, so that further description thereof is deemed unnecessary. The displaceable mass 33' is a contact member of a conductive potentiometer contact arm 36, restrained by spring 39, which spring is rigidly secured to an accelerating body 40. Potentiometer arm 36 is pivoted on a shaft and bearing bracket means 38 electrically connected to resistor 35. The displacement of the switch arm 36 with respect to body 40 caused by body acceleration determines the position of contact member 33' on potentiometer resistor 37, coupled to battery 34, and therefore determines the instantaneous current flowing in integrating network 35, 21. The output circuit of the tube 11 is coupled to any suitable work and space current supply circuits indicated generally at 10'.

Referring now to the operation of the embodiment illustrated in Fig. 1 it will be understood that resistors 28, 29 are rigidly secured with respect to a body whose acceleration in the line of movement of the weight is to be indicated, and that the instantaneous position of the mass 33 is determined by the stresses in springs 30, 31 and therefore by the acceleration of the body involved. The system illustrated has such operation that the acceleration of the body determines the displacement of mass 33, the displacement of the mass determines the resistance of ratio arms 24, 25 and the voltage applied to the integrating network, the successive instantaneous displacements of mass 33 determine the successive values of instantaneous current in the integrating network, with the result that the voltage across condenser 21 is proportional to the time integral of current and therefore proportional to the time integral of body acceleration. Since by definition the last-mentioned time integral is equal to the change in velocity, and since the condenser voltage causes the tube 11 to become conductive when it has reached a predetermined value, electromagnetic relay 12 is tripped when the velocity of the accelerating body has changed by a predetermined amount.

Let it be assumed that mass 33 is in equilibrium at a neutral point and that the body to which resistors 28, 29 are rigidly secured is moving in a horizontal plane, so that there exists no vertical component of acceleration. Let it further be assumed that bridge 23 has been balanced to the null point by adjustment of resistor 26, that condenser 21 has been fully discharged, that the switches have been closed and that tube 11 is biased to its nonconductive state. Under these conditions relay 12 remains open.

Now let it be assumed that the body accelerates in a generally vertical direction with either uniform or non-uniform acceleration and either continuously or without continuity. Under the last-discussed conditions relay 12 is tripped when the velocity of the body has changed by a predetermined amount. When the body accelerates in a vertical direction, mass 33 will be displaced downwardly. Now, $$F = Kma \qquad (1)$$

where

F is the magnitude of the force causing elongation of spring 30 and compression of spring 31,
K is a constant of proportionality,
m is the mass of weight 33, and
a is the acceleration of the body in the plane of the line of suspension of the mass.

It will be understood that the expressions "K", "K'," etc., indicate constants dependent on design factors and units chosen.

Also,
$$D = K'F = K''ma \quad (2)$$

where $D$ is the displacement of the mass or strain of the springs, and spring strain varies linearly with stress.

Further,
$$v = \int_{T_0}^{T_1} a \, dt \quad (3)$$

where $v$ is the component of velocity of the body in the plane of the line of suspension of the mass, at the end of the time interval $(T_0, T_1)$, and the initial component is zero. But from (2),
$$a = \frac{D}{K''m} \quad (4)$$

Therefore,
$$v = \frac{1}{K''m} \int_{T_0}^{T_1} D \, dt = K''' \int_{T_0}^{T_1} D \, dt \quad (5)$$

It follows from Equation 5 that the summation of the instantaneous values of the displacement of the mass times the corresponding infinitesimal periods of time is a function of and affords an indication of the change in the velocity of the body.

Now,
$$V = K''''D \quad (6)$$

where $V$ is the voltage applied to the integrating network by the bridge.

The last equation is satisfied when the circuit parameters are so chosen that the displacement of the weight causes increased compression of resistor 29 and a proportional decrease of its resistance but decreased compression of resistor 28 and a proportional increase of its resistance. Current then flows in such a direction as positively to charge condenser 21. By a proper adjustment of the supply and integrating circuit paramters the value of the supply circuit voltage may be made proportional to the displacement of the mass, so that the displaceable mass effectively controls the circuit arrangement for applying energy to the energy-storage means.

Also,
$$i = \frac{V}{R} E^{\frac{-t}{RC}} \quad (7)$$

where
$V$ is the applied voltage,
$R$ is the resistance of resistor 35.
$E$ is the natural logarithm base,
$C$ is the capacitance of condenser 21, and
$i$ is the current in the integrating network 35, 21.

Where the time constant of the integrating network is relatively long, the expression
$$\frac{-t}{RC}$$
can be made to approach unity, in which case
$$i = K'''''V = K''''''D \quad (8)$$

The instantaneous condenser current, in other words, the rate of application of energy to the energy-storage means, varies in proportion to the instantaneous displacement of the mass $D$ and therefore in proportion to the acceleration of the body concerned.

But,
$$E_c = \frac{1}{C} \int_{T_0}^{T_1} i \, dt \quad (9)$$

where $E_c$ is the condenser voltage.

From (8) and (9) it follows that
$$E_c = \frac{1}{C} \int_{T_0}^{T_1} K''''''D \, dt \quad (10)$$

From (10) and (5) it is demonstrated that
$$E_c = \frac{K''''''}{K'''} v = K'''''''v \quad (11)$$

The voltage across condenser 21 is therefore a function of and proportional to the change in velocity of the accelerating body.

When the velocity of the accelerating body has changed by the required amount the condenser potential "triggers" tube 11 which becomes conductive and causes relay 12 to operate in a manner well known to the art.

The operation of the Fig. 2 embodiment is generally similar to that of the Fig. 1 embodiment and further description thereof is deemed unnecessary.

The integral functional relationship between the condenser voltage and the displacement of mass 33 can be made linear if the time constant of the integrating network is long and can be made exponential if the time constant is relatively short. The constants of proportionality may be determined as desired by varying the constants of the supply circuit, the value of the Thyratron bias, the characteristics of the springs, the weight of the mass and other circuit parameters.

While there have been described what are at present considered to be preferred embodiments of this invention, it will be obvious to those skilled in the art that various changes and modifications may be made therein without departing from the invention, and it is, therefore, aimed in the appended claims to cover all such changes and modifications as are within the true spirit and scope of the invention.

The invention herein described may be manufactured and used by or for the Government of the United States of America for governmental purposes without the payment of any royalties thereon or therefor.

We claim:

1. A linear acceleration integrator and work and space current supply circuit to be carried by a vehicle having a continually increasing velocity in one direction at a predetermined time and for actuating an external device in response to a predetermined change in velocity of the vehicle and comprising, in combination, a source of electrical energy, a potentiometer including a resistance element fixed to the vehicle and a potentiometer arm, said resistance element being connected in parallel across said source of energy, said potentiometer arm being electrically conductive and connected to the input side of the current integrating circuit, resilient means for connecting said potentiometer arm to the vehicle, said potentiometer arm further being pivotally mounted at one end thereof to the vehicle and in a plane parallel to the direction of linear acceleration of the vehicle for swinging movement restrained by said resilient means, a current integrating circuit including series connected resistance and capacitance elements connected on the input side thereof to the output side of said potentiometer arm, a work and space current supply circuit, and a triode gaseous discharge tube having the grid thereof connected to said integrating circuit and the plate and cathode thereof respectively connected to opposite sides of said work and space current supply circuit, and means for biasing the gaseous discharge tube beyond cut off by a voltage corresponding to the change in velocity whereby the voltage across the capacitance element will be proportional to the time integral of linear acceleration of the vehicle and the tube will conduct to effect energization of the work and space supply circuit to actuate the external device upon attainment of the predetermined change in velocity.

2. In a linear acceleration integrator and work and space current supply circuit to be carried by an aircraft capable of attaining a predetermined change in velocity in one direction and having a source of electrical energy, a current integrating circuit, a work and space current supply circuit, and a triode gaseous discharge tube having the grid thereof connected to the integrating circuit and the plate and cathode thereof respectively connected to opposite sides of the work and space current supply circuit; a potentiometer including a resistance element and a potentiometer arm, said resistance element being fixed to the aircraft and connected in parallel across the source of energy, said potentiometer arm being electrically conductive, said potentiometer arm being pivotally mounted at one end thereof to the aircraft and in a plane parallel to the direction of linear acceleration of the aircraft, resilient means for connecting said potentiometer arm to the aircraft to thereby restrain swinging movement of the arm, said potentiometer arm carrying a mass on the end remote from the pivotally mounted end, and said potentiometer arm being electrically connected to the input side of the current integrating circuit.

References Cited in the file of this patent

UNITED STATES PATENTS

| | | |
|---|---|---|
| 1,317,072 | Carlier | Sept. 23, 1919 |
| 1,319,036 | Barus | Oct. 21, 1919 |
| 1,451,923 | Pierce, Jr. | Apr. 17, 1923 |
| 2,099,536 | Scherbatskoy et al. | Nov. 16, 1937 |
| 2,109,283 | Boykow | Feb. 22, 1938 |
| 2,193,910 | Wilson | Mar 19, 1940 |
| 2,251,973 | Beale et al. | Aug 12, 1941 |
| 2,309,560 | Welty | Jan. 26, 1943 |
| 2,338,732 | Nosker | Jan. 11, 1944 |
| 2,359,245 | Ritzmann | Sept. 26, 1944 |
| 2,382,847 | Baumann, Jr. | Aug. 14, 1945 |
| 2,384,348 | Schweitzer, Jr. | Sept. 14, 1945 |
| 2,390,581 | Gille | Dec. 11, 1945 |
| 2,391,966 | Harrison | Jan. 1, 1946 |
| 2,411,117 | Scherbatskoy | Nov. 12, 1946 |
| 2,463,553 | Olesen | Mar. 8, 1949 |
| 2,613,071 | Hansel | Oct. 7, 1952 |

FOREIGN PATENTS

| | | |
|---|---|---|
| 517,924 | Germany | Feb. 9, 1931 |
| 647,382 | France | July 30, 1928 |